US010294400B2

(12) United States Patent
Tsuchiya et al.

(10) Patent No.: US 10,294,400 B2
(45) Date of Patent: May 21, 2019

(54) COMPOSITION INCLUDING DIFLUOROMETHANE (HFC-32), PENTAFLUOROETHANE (HFC-125), AND 1,1,1,2-TETRAFLUOROETHANE (HFC-134A)

(71) Applicant: DAIKIN INDUSTRIES, LTD., Osaka (JP)

(72) Inventors: Tatsumi Tsuchiya, Osaka (JP); Takashi Shibanuma, Osaka (JP); Yasufu Yamada, Osaka (JP); Hitomi Kuroki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/100,757

(22) PCT Filed: Dec. 5, 2014

(86) PCT No.: PCT/JP2014/082309
§ 371 (c)(1),
(2) Date: Jun. 1, 2016

(87) PCT Pub. No.: WO2015/083834
PCT Pub. Date: Jun. 11, 2015

(65) Prior Publication Data

US 2016/0369144 A1 Dec. 22, 2016

(30) Foreign Application Priority Data

Dec. 6, 2013 (JP) ................................ 2013-253456

(51) Int. Cl.
*C09K 5/04* (2006.01)
*C10M 105/38* (2006.01)
(Continued)

(52) U.S. Cl.
CPC .......... *C09K 5/045* (2013.01); *C10M 105/38* (2013.01); *C10M 107/24* (2013.01);
(Continued)

(58) Field of Classification Search
CPC ............................ C09K 5/045; C09K 2205/22
See application file for complete search history.

(56) References Cited

U.S. PATENT DOCUMENTS 5,643,492 A * 7/1997 Shiflett ................ A62D 1/0057 252/67
5,711,158 A * 1/1998 Yoshida ................. C09K 5/045 62/114
(Continued)

FOREIGN PATENT DOCUMENTS

EP 509673 * 3/1997
JP 3-170585 7/1991
(Continued)

OTHER PUBLICATIONS

International Search Report dated Mar. 10, 2015 in corresponding International (PCT) Application No. PCT/JP2014/082309.
(Continued)

*Primary Examiner* — John R Hardee
(74) *Attorney, Agent, or Firm* — Wenderoth, Lind & Ponack, L.L.P.

(57) ABSTRACT

The present invention provides a mixed refrigerant having (1) a superior cooling COP compared to R410A, which is an existing alternative refrigerant to R22, and (2) an equal or superior refrigerating effect in comparison with R22, even under conditions of use in which the condensation temperature setting is high, such as at a high outside air temperature. The present invention pertains to a composition containing refrigerants, the refrigerant containing HFC-32, HFC-125, and HFC-134a, the mass ratio of the three components
(Continued)

being, in a ternary composition diagram having the three components as respective apexes, in the range of a triangle having the following three points as apexes:
point A (HFC32/HFC125/HFC134a=36/25/39 mass %);
point B (HFC32/HFC125/HFC134a=36/31/33 mass %); and
point C (HFC32/HFC125/HFC134a=43/34/23 mass %).

13 Claims, 2 Drawing Sheets

(51) Int. Cl.

| | |
|---|---|
| ***C10M 107/24*** | (2006.01) |
| ***C10M 107/34*** | (2006.01) |
| ***C10M 171/00*** | (2006.01) |
| ***F25B 31/00*** | (2006.01) |

(52) U.S. Cl.
CPC ...... *C10M 107/34* (2013.01); *C10M 171/008* (2013.01); *F25B 31/002* (2013.01); *C09K 2205/122* (2013.01); *C09K 2205/22* (2013.01); *C09K 2205/43* (2013.01); *C10M 2207/2835* (2013.01); *C10M 2209/043* (2013.01); *C10M 2209/1033* (2013.01); *C10N 2220/302* (2013.01); *C10N 2240/30* (2013.01); *F25B 2500/29* (2013.01)

(56) References Cited

U.S. PATENT DOCUMENTS 6,508,950 B1 * 1/2003 Lim ...................... C09K 5/045 252/67
2013/0096218 A1 * 4/2013 Rached .................. C09K 5/045 521/170

FOREIGN PATENT DOCUMENTS

| | | | |
|---|---|---|---|
| JP | 6-503828 | | 4/1994 |
| JP | 9324175 | | 12/1997 |
| JP | 3186065 | | 7/2001 |
| JP | 2011-84652 | | 4/2011 |
| JP | 2013-529703 | | 7/2013 |
| WO | WO 2011/077088 | * | 6/2011 |
| WO | 2011/163117 | | 12/2011 |

OTHER PUBLICATIONS

Decision to Grant a Patent dated Nov. 5, 2015 in corresponding Japanese Application No. 2014-247201, with English translation.
Notice of Reasons for Refusal dated Mar. 3, 2015 in corresponding Japanese Application No. 2014-247201, with English translation.
Written Argument filed May 7, 2015 in corresponding Japanese Application No. 2014-247201, with English translation.

* cited by examiner

COMPOSITION INCLUDING DIFLUOROMETHANE (HFC-32), PENTAFLUOROETHANE (HFC-125), AND 1,1,1,2-TETRAFLUOROETHANE (HFC-134A)

TECHNICAL FIELD

The present invention relates to a mixed refrigerant composition for use in refrigerators.

BACKGROUND ART

Chlorodifluoromethane is a type of chlorofluorocarbon (HCFC), and is also known by other names, such as R22 and HCFC22 (herein sometimes referred to as "R22"). Although R22 has been widely used as a refrigerant, it has recently been pointed out that R22 may cause ozone layer depletion and global warming.

Accordingly, in advanced nations, alternative refrigerants have been developed. As a typical alternative refrigerant, R410, which is a mixed refrigerant of HFC32 and HFC125, has been widely used. On the other hand, in developing countries, the replacement of R22 is about to begin under the Montreal Protocol. Since not depleting the ozone layer (having a zero ozone depletion potential) is a condition required of alternative refrigerants, R410A is one of the alternative refrigerant candidates.

On the other hand, in advanced nations, to reduce the global warming impact, a refrigerant having a low GWP (global warming potential) has been desired. Also, in developing countries, from the viewpoint of preventing global warming, a refrigerant having a low GWP is considered preferable, rather than R410A, which has a global warming potential higher than R22.

SUMMARY OF INVENTION

Technical Problem

In regions where the outside air temperature is high, i.e., so-called high outside air temperature regions (Middle East countries, etc.), the periphery of the outdoor units of, refrigerators sometimes becomes very hot. For example, when the air temperature becomes higher than 45° C., the temperature at the periphery of an outdoor unit of a refrigerator may exceed 60° C. When an air-cooled condenser is used, the condensation temperature is generally set to a temperature that is approximately 15K higher than the outside air temperature, although this may vary depending on the capacity of the heat exchanger.

The R410A that is currently used has a critical temperature of 71.6° C., which is lower than R22 by about 25K. Accordingly, when a refrigeration cycle is operated under conditions such that the condensation temperature setting is high (50° C. or higher), the critical temperature becomes closer to the condensation temperature, which results in less latent heat of vaporization, thus tending to deteriorate the theoretical cooling COP (Coefficient Of Performance), which represents the cooling capacity per kilowatt of power consumed when cooling under rated conditions. When the theoretical cooling COP is poor, a significant difference in power consumption occurs due to a particularly long cooling operation time in high outside air temperature regions.

An object of the present invention is to provide a mixed refrigerant that has (1) a superior cooling COP compared to R410A, which is an existing alternative refrigerant for R22, and (2) an equal or superior refrigerating effect in comparison with R22, even under conditions of use in which the condensation temperature setting is high, such as when the outside air temperature is high.

Solution to Problem

The present inventors conducted extensive research to achieve the above object. As a result, the present inventors found that the above object can be achieved by using a mixed refrigerant composition comprising difluoromethane (HFC32), pentafluoroethane (HFC125), and 1,1,1,2-tetrafluoroethane (HFC134a), the mass ratio of the three components being, in a ternary composition diagram having the three components as respective apexes, in the range of a triangle having the following three points as apexes:

point A (HFC32/HFC125/HFC134a=36/25/39 mass %);
point B (HFC32/HFC125/HFC134a=36/31/33 mass %); and
point C (HFC32/HFC125/HFC134a=43/34/23 mass %).

The present invention has been accomplished through further research based on the above findings. The present invention includes the following embodiments.

Item 1. A composition comprising refrigerants comprising difluoromethane (HFC32), pentafluoroethane (HFC125), and 1,1,1,2-tetrafluoroethane (HFC134a), the mass ratio of the three components being, in a ternary composition diagram having the three components as respective apexes, in the range of a triangle having the following three points as apexes:
point A (HFC32/HFC125/HFC134a=36/25/39 mass %);
point B (HFC32/HFC125/HFC134a=36/31/33 mass %); and
point C (HFC32/HFC125/HFC134a=43/34/23 mass %).

Item 2. A composition comprising refrigerants comprising HFC-32, HFC-125, and HFC-134a, the mass ratio of the three components being, in a ternary composition diagram having the three components as respective apexes, in the range of a triangle having the following three points as apexes:
point A' (HFC32/HFC125/HFC134a=40/30/30 mass %);
point B'(HFC32/HFC125/HFC134a=40/32/28 mass %); and
point C (HFC32/HFC125/HFC134a=43/34/23 mass %).

Item 3. The composition according to Item 1 or 2 further comprising refrigerant oil.

Item 4. The composition according to Item 3, wherein the refrigerant oil is at least one refrigerant oil selected from the group consisting of polyalkylene glycol (PAG), polyol ester (POE), and polyvinyl ether (PVE).

Item 5. The composition according to any one of Items 1 to 4 that is used as an alternative refrigerant to chlorodifluoromethane (R22).

Item 6. The composition according to any one of Items 1 to 5 that is used to operate a refrigeration cycle in which the refrigerants are condensed at 50 to 70° C.

Item 7. Use of the composition according to any one of Items 1 to 4 as an alternative refrigerant to R22.

Item 8. Use of the composition according to any one of Items 1 to 4 for operating a refrigeration cycle in which the refrigerants are condensed at 50 to 70° C.

Item 9. A refrigeration method comprising a step of operating a refrigeration cycle using the composition according to any one of Items 1 to 4.

Item 10. A method for operating a refrigerator comprising the step according to Item 9.

Item 11. The method according to Item 10, wherein the refrigerator is a vapor compression refrigerator.

Item 12. A refrigerator comprising the composition according to any one of Items 1 to 4.

Item 13. A method for producing a composition comprising HFC-32, HFC-125, and HFC-134a, comprising mixing the three components in amounts such that the mass ratio of the three components is, in a ternary composition diagram having the three components as respective apexes, in the range of a triangle having the following three points as apexes:
point A (HFC32/HFC125/HFC134a=36/25/39 mass %);
point B (HFC32/HFC125/HFC134a=36/31/33 mass %); and
point C (HFC32/HFC125/HFC134a=43/34/23 mass %).

Advantageous Effects of Invention

The composition of the present invention has the following principal effects: (1) a cooling COP that is superior to R410A, and (2) a refrigerating effect that is equal or superior to R22, even under conditions of use in which the condensation temperature is high, such as when the outside air temperature is high.

Further, the composition of the present invention may have the following additional effects: (3) a zero ozone depletion coefficient; (4) a lower GWP than R22; and (5) non-flammability.

DESCRIPTION OF EMBODIMENTS

1. Composition

The composition of the present invention contains refrigerants comprising difluoromethane (herein sometimes referred to as "HFC32"), pentafluoroethane (herein sometimes referred to as "HFC125"), and 1,1,1,2-tetrafluoroethane (herein sometimes referred to as "HFC134a"), wherein the mass ratio of the three components is, in a ternary composition diagram having the three components as respective apexes, in the range of a triangle having the following three points as apexes:
point A (HFC32/HFC125/HFC134a=36/25/39 mass %);
point B (HFC32/HFC125/HFC134a=36/31/33 mass %); and
point C (HFC32/HFC125/HFC134a=43/34/23 mass %).

Figure 1:
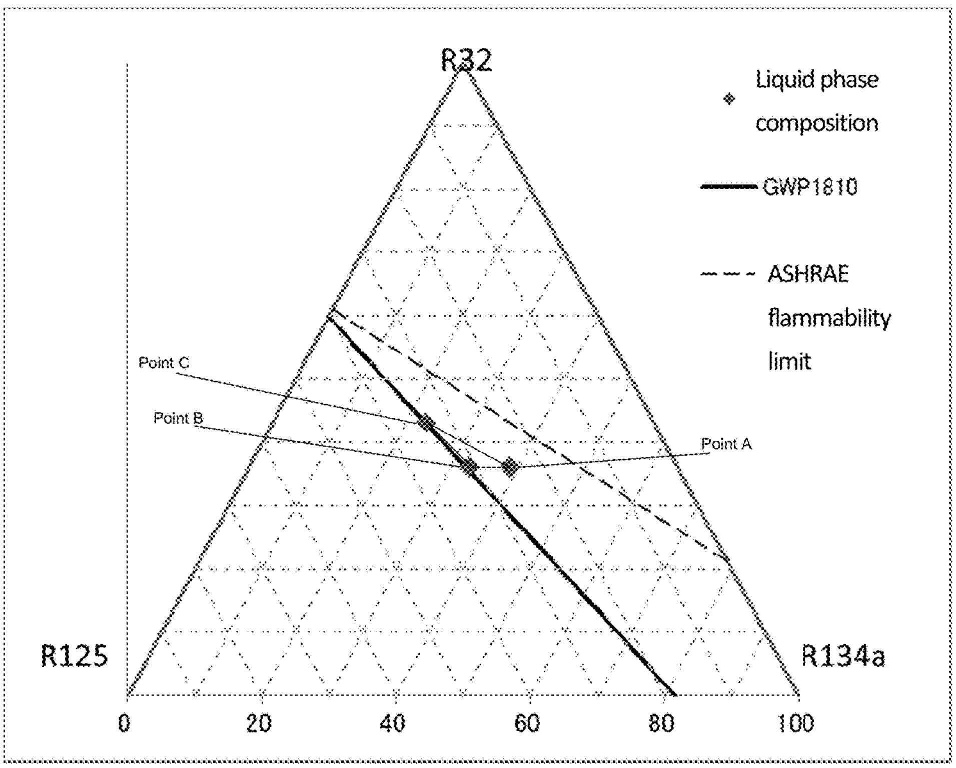
FIG. 1 is a ternary composition diagram (mass ratio) having HFC32, HFC125, and HFC134a as respective apexes, in which point A, point B, and point C, a GWP of 1810 indicated by a solid line, and ASHRAE flammability limit indicated by a dotted line are shown.

FIG. 1 shows point A, point B, and point C in a ternary composition diagram (mass ratio) having HFC32, HFC125, and HFC134a as respective apexes.

The non-flammability limit area of the three components of HFC32, HFC125, and HFC134a according to ASHRAE is such that the mass ratio of the three components (HFC32/HFC125/HFC134a=x/y/z mass %) is in the range of $$y=0.975x-20.475,$$

$$z=100-x-y, \text{ and}$$

$$21 \le x \le 61$$

in the ternary composition diagram (FIG. 1).

The composition having a GWP of the HFC32/HFC125/HFC134a three components of 1810 or less is such that the mass ratio of the three components (HFC32/HFC125/HFC134a=x/y/z mass %) is in the range of $$y=0.3649x+18.35$$

$$z=100-x-y, \text{ and}$$

$$0 \le x \le 59.83$$

in the ternary composition diagram (FIG. 1).

That is, the composition of the present invention contains refrigerants comprising HFC32, HFC125, and HFC134a, wherein the mass ratio of the three components (HFC32/HFC125/HFC134a=x/y/z mass %) satisfies the following formulas (1) to (4):

$$36 \le x \le 43 \quad (1),$$

$$y=0.365x+18.395 \quad (2),$$

$$y=0.3649x+18.35 \quad (3), \text{ and}$$

$$z=100-x-y \quad (4).$$

When the proportion x of HFC32 is 36 mass % or more (formula (1)), the refrigeration capacity of the composition of the present invention is increased by at least 5%, compared to R22.

When the proportion x of HFC32 is 43 mass % or less (formula (1)), the cooling COP of the composition of the present invention is increased by at least 2%, compared to R410A.

When formulas (2) and (4) are simultaneously satisfied, the GWP (ITH=100 yr) of the composition of the present invention is 1810 or less.

When formulas (1), (3), and (4) are simultaneously satisfied, the composition of the present invention is non-flammable.

The composition of the present invention may contain refrigerants comprising HFC32, HFC125, and HFC134a, wherein the mass ratio of the three components is, in a ternary composition diagram having the three components as respective apexes, in the range of a triangle having the following three points as apexes:
point A' (HFC32/HFC125/HFC134a=40/30/30 mass %);
point B'(HFC32/HFC125/HFC134a=40/32/28 mass %); and
point C (HFC32/HFC125/HFC134a=43/34/23 mass %).

Figure 2:
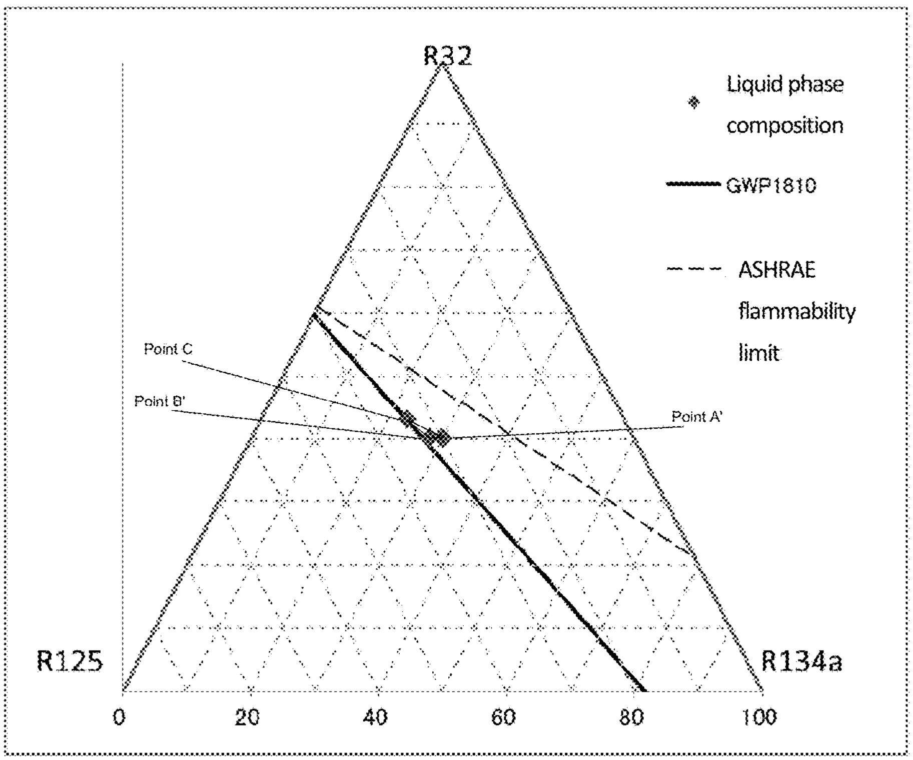
FIG. 2 is a ternary composition diagram (mass ratio) having HFC32, HFC125, and HFC134a as respective apexes, in which point A', point B', and point C, a GWP of 1810 indicated by a solid line, and ASHRAE flammability limit indicated by a dotted line are shown.

FIG. 2 shows point A', point B', and point C in a ternary composition diagram (mass ratio) having HFC32, HFC125, and HFC134a as apexes.

That is, the composition of the present invention contains refrigerants comprising HFC32, HFC125, and HFC134a, wherein the mass ratio of the three refrigerant components (HFC32/HFC125/HFC134a=x/y/z mass %) satisfies the above formulas (2) to (4) and the following formula (5):

$$40 \le x \le 43 \quad (5).$$

When the proportion x of HFC32 is 40 mass % or more (formula (5)), the refrigeration capacity is increased by at least 10%, compared to R22.

The compositions that have a mass ratio within a triangle having point A', point B', and point C as apexes have excellent refrigerating capacity and are thus preferable.

The composition of the present invention contains HFC32, HFC125, and HFC134a as refrigerants. The composition of the present invention may further contain refrigerants other than HFC32, HFC125, and HFC134a, as long as the principal effects of the present invention are not impaired. In this case, the kinds of other refrigerants and their proportions in the total amount of the refrigerants can be suitably selected and set as long as the principal effects of the present invention are not impaired. The proportions of the other refrigerants may vary according to the types of refrigerants and are not particularly limited; however, the total amount of the other refrigerants preferably accounts for 0 to 10 mass %, and more preferably 0 to 5 mass % of the total refrigerant amount.

The composition of the present invention may contain refrigerants consisting of HFC32, HFC125, and HFC134a (i.e., a ternary mixed refrigerant).

The composition of the present invention is non-flammable and has a low GWP. Specifically, the composition of the present invention has a GWP (ITH=100 yr) of 1810 or less. This value is more advantageous than that of R410A (GWP=2088).

The composition of the present invention may further contain refrigerant oil although such use of the refrigerant oil is not particularly essential. In this case, the composition of the present invention contains at least refrigerant oil in addition to refrigerants.

The composition of the present invention may contain refrigerant oil that is not particularly limited to but can be suitably selected from commonly used refrigerant oils. In this case, a refrigerant oil that is more excellent in terms of compatibility (miscibility) with the refrigerant used and stability of the refrigerant, etc., may be appropriately selected. Although there is no particular limitation, the stability of the refrigerant can be evaluated by using a commonly used method. Examples of such methods include an evaluation method using the amount of free fluorine ions as an index according to ASHRAE standard 97-2007, and like methods. Other examples of usable methods include an evaluation method using the total acid number as an index, and the like. This method can be performed, for example, according to ASTM D 974-06.

The composition of the present invention may contain refrigerant oil that may include, but is not limited to, at least one member selected from the group consisting of polyalkylene glycol (herein sometimes referred to as "PAG"), polyol ester (herein sometimes referred to as "POE"), and polyvinyl ether (herein sometimes referred to as "PVE").

The refrigerant oil to be used is not particularly limited but may have a kinematic viscosity at 40° C. of 5 to 400 cSt. When the refrigerant oil has a kinematic viscosity within this range, it is preferable in terms of lubricity.

In the above case, the proportion of the refrigerant oil in the composition is not particularly limited, but is typically 10 to 50 wt. %.

If necessary, the composition of the present invention may contain a stabilizer, for example, to meet the requirement of high stability under severe conditions of use, although such use of the stabilizer is not particularly essential.

Examples of such stabilizers include (i) aliphatic nitro compounds, such as nitromethane and nitroethane; and aromatic nitro compounds, such as nitrobenzene and nitrostyrene; (ii) ethers, such as 1,4-dioxane; and amines, such as 2,2,3,3,3-pentafluoropropylamine and diphenylamine; butylhydroxyxylene, benzotriazole, and the like. The stabilizers can be used singly or in a combination of two or more.

The amount of the stabilizer can be appropriately set as long as it does not impair the principal effects of the present invention, although it may vary depending on the type of stabilizer. Typically, the amount of the stabilizer is preferably about 0.01 to 5 parts by weight, and more preferably about 0.05 to 2 parts by weight, per 100 parts by weight of the total refrigerant amount.

The composition of the present invention may further contain a polymerization inhibitor, if necessary. Examples of polymerization inhibitors include 4-methoxy-1-naphthol, hydroquinone, hydroquinonemethyl ether, dimethyl-t-butyl phenol, 2,6-di-tert-butyl-p-cresol, benzotriazole, and the like.

Typically, the amount of the polymerization inhibitor is preferably about 0.01 to 5 parts by weight, and more preferably about 0.05 to 2 parts by weight, per 100 parts by weight of the total refrigerant amount.

The composition of the present invention may further contain a drying agent.

The composition of the present invention may further contain other components.

2. Application and Use of the Composition (Use)

The composition of the present invention can be used as an alternative refrigerant to R22.

Specifically, the composition of the present invention can be used in place of R22 in a refrigeration method comprising operating a refrigeration cycle using R22.

Since the composition of the present invention is similar to R22 in terms of properties, the composition of the present invention can be used as a drop-in alternative refrigerant or a nearly drop-in alternative refrigerant to R22 in refrigerating and air-conditioning equipment in which R22 is used.

Although the use of the composition is not particularly limited, the composition can be used for operating a refrigeration cycle in which the refrigerants are condensed at 50 to 70° C.

In general, when a refrigeration cycle is operated under relatively high temperature conditions, such as conditions in which the condensation temperature is 50 to 70° C., the critical temperature becomes close to the condensation temperature, which results in less latent heat of vaporization, thus tending to deteriorate the theoretical cooling COP (Coefficient Of Performance), which represents the cooling capacity per kilowatt of power consumed during cooling under rated conditions. The composition of the present invention has a cooling COP that is increased by at least 2%, compared to R410A, and can maintain an excellent cooling COP even when used in a refrigeration cycle in which the refrigerants are condensed at 50 to 70° C. Accordingly, the composition of the present invention is particularly suitable for use in operating a cooling cycle where the refrigerants are condensed at 50 to 70° C.

The composition of the present invention can be used in various refrigerators. In this specification, the term "refrigerator" refers to, in a broad sense, any device that eliminates heat from an object or space to thereby make its temperature lower than the outside air temperature and that maintains the low temperature. Specifically, in a broad sense, the refrigerator refers to a convertor that obtains energy from the exterior, performs work, and converts the energy to transfer heat from the lower to the higher temperature. In the present invention, in a broad sense, the refrigerator refers to the same thing as a heat pump.

In the present invention, in a narrow sense, refrigerators are distinguished from heat pumps in terms of the temperature range used and operating temperature. In this case, devices having a low-temperature heat source in a temperature range lower than atmospheric temperature may be called refrigerators, whereas devices having a low-temperature heat source at a temperature close to atmospheric temperature and driving a refrigeration cycle to utilize the heat dissipation effect may be called heat pumps. There are also devices that have both the function of a refrigerator in a narrow sense and the function of a heat pump in a narrow sense, in one piece of equipment, such as air conditioners having "a cooling mode," "a heating mode," etc. In this specification, the terms "refrigerator" and "heat pump" are used in a broad sense, unless otherwise specified.

Examples of refrigerators in the present invention include, but are not limited to, a broad range of devices, such as fridges, water chillers, ice machines, turbo refrigerators, chillers (chilling units), screw refrigerators, refrigeration/freezing units, refrigerating showcases, freezing showcases, automatic vending machines, domestic air conditioners, packaged air conditioners, window-type air conditioners, mobile air conditioners, and the like.

Examples of refrigerators include, but are not limited to, vapor compression refrigerators, vapor jet refrigerators, air cycle refrigerators, electronic refrigerators, and the like.

The refrigerators in which the composition of the present invention is usable may be those for domestic use or for business (industrial, experimental, transportation, and like) uses.

The size of the refrigerator is also not particularly limited. For example, the refrigerator may be a beer server, a refrigerator for containers, and the like.

Examples of mobile air conditioners include, but are not limited to, car air conditioners, railroad air conditioners, air conditioners for transportation machines, spot air conditioners, portable air conditioners, air conditioners for large agricultural machines, air conditioners for construction equipment, and the like.

3. Refrigeration Method

The refrigeration method of the present invention comprises operating a refrigerating cycle using the composition of the present invention.

The details of the refrigerating cycle can be suitably set.

EXAMPLES

The present invention is described in detail below with reference to Examples. However, the present invention is not limited to the Examples.

Test Example 1

Using R32/R125/R134a mixed refrigerants shown in Examples 1 to 15 of Table 1 as refrigerants, a heat pump with a rated cooling capacity of 4 kW was operated under conditions such that the evaporation temperature of each refrigerant in an evaporator was 5° C. and the condensation temperature of each refrigerant in a condenser was set as shown in Table 1, with a superheating degree of 1K and a supercooling degree of 5K.

As a comparative example, the heat pump was operated under the same conditions as above except that an R410A refrigerant (Comparative Example 1) was used. The coefficient of performance (cooling COP) was calculated from these results according to the following formula.

Cooling COP=Refrigerating capacity/Amount of electrical power consumed

Table 1 shows the results. The cooling COP ratio indicates a ratio with the value obtained using R410A being defined as 100.

Test Example 2

Using R32/R125/134a mixed refrigerants shown in Examples 16 to 30 in Table 1 as refrigerants, a heat pump with a rated cooling capacity of 4 kW was operated under conditions such that the evaporation temperature of each refrigerant in an evaporator was 5° C. and the condensation temperature of each refrigerant in a condenser was set as shown in Table 1, with a superheating degree of 1K and a supercooling degree of 5K.

As a comparative example, the heat pump was operated under the same conditions as above except that an R22 refrigerant (Comparative Example 2) was used.

The refrigerating effects were calculated from these results according to the following formula.

Refrigerating effect=Refrigerating capacity/Amount of refrigerant circulated

Table 1 Shows the results. The refrigerating effect ratio indicates a ratio with the value obtained using R22 being defined as 100.

TABLE 1

| Comparative | Refrigerant mass % R410A | | | Cooling COP ratio relative to R410A = 100 Condensation temperature | | |
|---|---|---|---|---|---|---|
| Example 1 | R32 | R125 | R134a | 50° C. | 60° C. | 70° C. |
| Example 1 | 36 | 25 | 39 | 104 | | |
| Example 2 | 36 | 31 | 33 | 103 | | |
| Example 3 | 40 | 30 | 30 | 103 | | |
| Example 4 | 40 | 32 | 28 | 103 | | |
| Example 5 | 43 | 34 | 23 | 102 | | |
| Example 6 | 36 | 25 | 39 | | 106 | |
| Example 7 | 36 | 31 | 33 | | 105 | |
| Example 8 | 40 | 30 | 30 | | 105 | |
| Example 9 | 40 | 32 | 28 | | 105 | |
| Example 10 | 43 | 34 | 23 | | 104 | |
| Example 11 | 36 | 25 | 39 | | | 111 |
| Example 12 | 36 | 31 | 33 | | | 109 |
| Example 13 | 40 | 30 | 30 | | | 109 |
| Example 14 | 40 | 32 | 28 | | | 108 |
| Example 15 | 43 | 34 | 23 | | | 107 |
| Comparative | Refrigerant mass % R22 | | | Refrigerating effect ratio relative to R22 = 100 Condensation temperature | | |
| Example 2 | R32 | R125 | R134a | 50° C. | 60° C. | 70° C. |
| Example 16 | 36 | 25 | 39 | 114 | | |
| Example 17 | 36 | 31 | 33 | 117 | | |
| Example 18 | 40 | 30 | 30 | 120 | | |
| Example 19 | 40 | 32 | 28 | 121 | | |
| Example 20 | 43 | 34 | 23 | 126 | | |
| Example 21 | 36 | 25 | 39 | | 110 | |
| Example 22 | 36 | 31 | 33 | | 112 | |
| Example 23 | 40 | 30 | 30 | | 116 | |
| Example 24 | 40 | 32 | 28 | | 117 | |
| Example 25 | 43 | 34 | 23 | | 121 | |
| Example 26 | 36 | 25 | 39 | | | 105 |
| Example 27 | 36 | 31 | 33 | | | 107 |
| Example 28 | 40 | 30 | 30 | | | 110 |
| Example 29 | 40 | 32 | 28 | | | 111 |
| Example 30 | 43 | 34 | 23 | | | 114 |

The invention claimed is:

1. A composition comprising refrigerants comprising difluoromethane (HFC32), pentafluoroethane (HFC125), and 1,1,1,2-tetrafluoroethane (HFC134a), the mass ratio of the three components being, in a ternary composition diagram having the three components as respective apexes, in the range of a triangle having the following three points as apexes:

point A (HFC32/HFC125/HFC134a=36/25/39 mass %);

point B (HFC32/HFC125/HFC134a=36/31/33 mass %); and point C (HFC32/HFC125/HFC134a=43/34/23 mass %), wherein the total amount of HFC-32, HFC-125 and HFC-134a is 95 mass % or more of the total amount of refrigerants wherein the composition is non-flammable and has a global warming potential of 1810 or less.

2. The composition according to claim 1 further comprising refrigerant oil.

3. The composition according to claim 2, wherein the refrigerant oil is at least one refrigerant oil selected from the group consisting of polyalkylene glycol (PAG), polyol ester (POE), and polyvinyl ether (PVE).

4. The composition according to claim 1 that is used as an alternative refrigerant to chlorodifluoromethane (R22).

5. The composition according to claim 1 that is used to operate a refrigeration cycle in which the refrigerants are condensed at 50 to 70° C.

6. A method for refrigeration comprising operating a refrigeration cycle in combination with the composition according to claim 1 as an alternative refrigerant to R22.

7. The method for refrigeration according to claim 6, wherein the refrigerants are condensed at 50 to 70° C. in the refrigeration cycle.

8. A method for refrigeration comprising operating a refrigerator in combination with the composition according to claim 1 as a refrigerant.

9. The method for refrigeration according to claim 8, wherein the refrigerants are condensed at 50 to 70° C.

10. The method according to claim 8, wherein the refrigerator is a vapor compression refrigerator.

11. A refrigerator comprising the composition according to claim 1.

12. A composition comprising refrigerants comprising HFC-32, HFC-125, and HFC-134a, the mass ratio of the three components being, in a ternary composition diagram having the three components as respective apexes, in the range of a triangle having the following three points as apexes:

point A' (HFC32/HFC125/HFC134a=40/30/30 mass %);

point B'(HFC32/HFC125/HFC134a=40/32/28 mass %); and point C (HFC32/HFC125/HFC134a=43/34/23 mass %), wherein the total amount of HFC-32, HFC-125 and HFC-134a is 95 mass % or more of the total amount of refrigerants wherein the composition is non-flammable and has a global warming potential of 1810 or less.

13. A method for producing a composition comprising refrigerants comprising HFC-32, HFC-125, and HFC-134a, said method comprising mixing the three components in amounts such that the mass ratio of the three components is, in a ternary composition diagram having the three components as respective apexes, in the range of a triangle having the following three points as apexes:

point A (HFC32/HFC125/HFC134a=36/25/39 mass %);

point B (HFC32/HFC125/HFC134a=36/31/33 mass %); and point C (HFC32/HFC125/HFC134a=43/34/23 mass %), wherein the total amount of HFC-32, HFC-125 and HFC-134 is 95 mass % or more of the total amount of refrigerants wherein the composition is non-flammable and has a global warming potential of 1810 or less.

* * * * *